United States Patent
Krause et al.

(10) Patent No.: US 7,053,829 B2
(45) Date of Patent: May 30, 2006

(54) METHOD FOR DETERMINING A POSITION WITH THE AID OF A RADIO SIGNAL HAVING A ROTATING TRANSMISSION CHARACTERISTIC

(75) Inventors: Jörn Krause, Berlin (DE); Marcus Purat, Berlin (DE); Axel Meiling, Berlin (DE); Malte Schmidt, Bocholt (DE); Stephen William Wales, Southampton (GB)

(73) Assignee: Siemens Aktiengesellschaft, Munich (DE)

( * ) Notice: Subject to any disclaimer, the term of this patent is extended or adjusted under 35 U.S.C. 154(b) by 83 days.

(21) Appl. No.: 10/501,221

(22) PCT Filed: Jan. 2, 2003

(86) PCT No.: PCT/EP03/00004

§ 371 (c)(1),
(2), (4) Date: Jul. 12, 2004

(87) PCT Pub. No.: WO03/058272

PCT Pub. Date: Jul. 17, 2003

(65) Prior Publication Data

US 2005/0035906 A1    Feb. 17, 2005

(30) Foreign Application Priority Data

Jan. 10, 2002   (DE) ............................... 102 00 676
Jan. 10, 2002   (EP) ............................... 02000613

(51) Int. Cl.
G01S 1/44    (2006.01)

(52) U.S. Cl. ...................................... 342/398; 342/457

(58) Field of Classification Search ................ 342/386, 342/398, 428, 430, 449, 457
See application file for complete search history.

(56) References Cited

U.S. PATENT DOCUMENTS

| | | | |
|---|---|---|---|
| 2,661,467 A | | 12/1953 | Jones |
| 3,349,399 A | | 10/1967 | Böhm |
| 3,680,122 A | * | 7/1972 | Graham et al. ............. 342/455 |
| 3,816,832 A | * | 6/1974 | Elwood ...................... 342/458 |
| 4,912,643 A | * | 3/1990 | Beirne ........................ 702/150 |
| 4,939,522 A | | 7/1990 | Newstead et al. |
| 5,100,229 A | * | 3/1992 | Lundberg et al. .......... 356/3.12 |
| 5,157,408 A | | 10/1992 | Wagner et al. |
| 5,859,612 A | * | 1/1999 | Gilhousen ................... 342/457 |
| 6,198,528 B1 | * | 3/2001 | Maynard .................. 356/141.1 |

FOREIGN PATENT DOCUMENTS

| | | |
|---|---|---|
| DE | 100 44 657 A1 | 3/2001 |
| DE | 199 55 044 A1 | 8/2001 |
| DE | 1102084 B2 | 4/2004 |
| GB | 1176199 | 1/1970 |
| GB | 1 233 384 | 5/1971 |
| WO | WO99/33302 | 7/1999 |
| WO | WO01/18765 A2 | 3/2001 |

* cited by examiner

*Primary Examiner*—Dao Phan
(74) *Attorney, Agent, or Firm*—Staas & Halsey LLP

(57) ABSTRACT

A method determines the position of a mobile object by using at least one radio signal having a rotating transmission characteristic with at least one reference station. The relation between the orientation of the transmission characteristic and reference events is communicated to the mobile object. The orientation of the transmission characteristic and the relative position with respect to the reference station can be determined from the reference event.

22 Claims, 8 Drawing Sheets

METHOD FOR DETERMINING A POSITION WITH THE AID OF A RADIO SIGNAL HAVING A ROTATING TRANSMISSION CHARACTERISTIC

CROSS REFERENCE TO RELATED APPLICATIONS

This application is based on and hereby claims priority to PCT Application No. PCT/EP03/00004 filed on Jan. 2, 2003, European Application No. 02000613.6 filed on Jan. 10, 2002 and German Application No. 102 00 676.8 filed on Jan. 10, 2002, the contents of which are hereby incorporated by reference.

BACKGROUND OF THE INVENTION

The invention relates to a method for determining a position with the aid of radio navigation. At least one radio signal having a rotating transmission characteristic is used for this purpose. This method can be used for determining the position of a mobile object relative to at least one other mobile or stationary object, i.e. relative to at least one reference station.

A method of this kind is disclosed in principle in U.S. Pat. No. 5,157,408. This describes a determination of the relative distance and relative position of a mobile object with respect to a reference station, which features a rotating antenna for radiating a rotating radio signal. In this case, a pseudo noise coded, i.e. PN spread-spectrum signal, transmitted as the radio signal, is modulated with information on the direction of radiation of the rotating radio signal, from which the mobile object can determine its position relative to the reference station. As an alternative to this, a mobile object that can determine its position from the time difference between the time point of the receipt of the rotating radio signal with the maximum reception field strength and the transmission of a North reference signal for the North orientation of the rotating radio signal is described. The mobile object determines the relative distance by transmitting a request signal to the reference station that answers with a corresponding response signal. The mobile object can determine the relative distance to the reference station from the signal transit time or the phase shift between the request signal and response signal.

A disadvantage according to related art is that, to continuously determine the position, useful data from which the mobile object determines the orientation of the radio signal, must be transmitted to the mobile object just to determine the position and also an additional signaling is again necessary between the mobile object and reference station to determine the distance. The method according to related art continuously takes up a certain part of the transmission capacity and is therefore particularly disadvantageous for radio systems in which further data has to be transmitted by radio, such as, for example, in known radio communication systems.

SUMMARY OF THE INVENTION

One potential object of the present invention is to provide a possibility for determining the position by a radio signal with a rotating transmission characteristic that requires only a low transmission capacity.

The inventors proposed comprises a method for determining the position of a mobile object with the aid of radio navigation by using at least one radio signal of at least one reference station. Mobile objects are, for example, mobile terminals of a radio communication system, but also include other mobile objects such as vehicles, robots etc., that are at least fitted with suitable equipment for radio navigation.

In accordance with the method, it is provided that first the relationship between the orientation of the transmission characteristic and reference events is communicated to the mobile object. This information can be communicated to the mobile object once, in the simplest case, or also in regular, more lengthy time intervals, from the reference station or other suitable devices and then stored in a data memory of the mobile object. This means that signaling between the reference station and mobile object is required only once or, if necessary, in regular, lengthier time intervals. The information can also, for example, already be stored in a suitable data memory of the mobile object before performing the described procedure, for example during the manufacture of the mobile object, such as a terminal for a radio communication system.

When the rotating transmission characteristic of the radio signal is detected by the mobile object, that as described has a transmission characteristic that varies over time over an angle range of 360° around the reference station, the mobile object merely checks for the presence of a reference event, without a further signaling being necessary between the mobile object and the reference station. By using the stored information on the relationship between the reference events and the orientation of the transmission characteristic, the mobile object can determine the orientation of the transmission characteristic from the reference event. From the orientation of the transmission characteristic, the mobile object can in turn determine its position relative to the reference station. The first part of the required position information of the mobile object is thus present.

Finally, the mobile object can, in accordance with a first development, determine its relative distance from the reference station from the signal parameters of the radio signal. To do this, the mobile object accesses information that is available in the framework of the transmission of the radio signal in any case, without additional signaling being required. The mobile object can consider measured physical transmission parameters of the radio signal as signal parameters, such as the attenuation of the transmission signal (path loss) along the propagation path, the signal-to-noise ratio or similar quality parameters. Alternatively, or in addition, the data content of the radio signal, that contains information on the physical transmission parameters of the radio signal, can also be regarded as signal parameters. In this case, for example, data content can be considered that contains information on the signal transit time between the reference station and mobile object, such as the timing advance information in radio communication systems.

Alternatively, it can also be provided that the mobile object alone can determine its position on the basis of information on the relative position with respect to several reference stations, with the relative position being determined as already described. In this case, it is again a method for determining the position of a mobile object with the aid of radio navigation by using a radio signal of at least one reference station having a rotating transmission characteristic. In this case, also, it is provided that the relationship between the orientation of the transmission characteristic and the reference events are communicated to the mobile object, as already described.

It is now provided that the mobile object, on detection of the rotating transmission characteristic of a first radio signal checks for the presence of a reference event, from which reference event the orientation of the transmission characteristic of the first radio signal is determined and from which the orientation of the transmission characteristic of the first radio signal determines its position relative to a first reference station. In a second step, the mobile objects checks, on detection of the rotating transmission characteristic of the second radio signal, for the presence of a further reference event, determines the orientation of the transmission characteristic of the second radio signal from the further reference event and determines its position relative to a second reference station from the orientation of the transmission characteristic of the second radio signal.

These steps correspond to the steps already described for determining the relative position. But because the position of the mobile object relative to two reference stations is now known, the mobile object can determine its position relative to the reference stations from the position relative to the first and second reference station. This results geometrically from the intersection point of two straight lines that emanate from the location of the reference stations and the direction of which is defined by the position of the mobile object relative to the reference stations.

As reference events in accordance with the aforementioned method, reference events characterized by time can, for example, be communicated to the mobile object. In particular, the time point, after which time duration from a certain starting time point or at which time periods the rotating transmission characteristic assumes a certain orientation, can be communicated.

Alternatively, or in addition, defined data structures or data content of the radio signal can also be communicated as reference events. In this case, at what defined data structure or at what defined data content the rotating transmission characteristic assumes what certain orientation on transmission or reception can be communicated. For example, identification data that identifies certain data segments of the radio signal can be communicated as reference events. If the data is transmitted in the form of data frames, the number of data frames (sequence frame number), for example, can be communicated as identification data. In such cases, the mobile object knows what specific orientation the rotating transmission characteristic assumes on the transmission of what numbered data frame. These numbers of the data frame are in any case provided in the corresponding radio systems and can thus be simply used as reference events. Other data structures or data content can also be used, that are in any case also contained in the radio signals to be transmitted and that can be assigned to a specific orientation of transmission characteristic.

The rotating transmission characteristic can be created by at least one rotating directional radiation of the radio signal. A single rotating directional radiation method is, in principle, known from the related art quoted in the introduction. The rotating transmission characteristic can, however, be advantageously generated by several rotating directional radiations of the radio signal. Several directional radiations are thus generated, that follow each other in a certain time sequence, with the first directional radiation not having yet completed a 360° rotation starting from a determined radiation angle when a succeeding directional radiation has reached this certain radiation angle.

As an alternative to directional radiation, the rotating transmission characteristic can also be generated by an omni directional radiation characteristic of the radio signal in which at least one rotating directional attenuation of the radio signal is generated. The rotating transmission characteristic then results from at least one rotating minimum of the radiation of the radio signal. In this case, similar to the case where there are several directional radiations, several directional attenuations can also be provided.

In principle, the reference stations can transmit any radio signal for all of the methods described here, for example, instead of purely position determining signals, signals used to transmit communication data or signaling data of a radio communication system that contain voice data, multimedia data or other useful and control data, can be used.

If as part of the previously described method, the absolute position of the reference station can additionally be communicated to the mobile object or stored, the mobile object can also determine its own absolute position from the position relative to the reference station by using the knowledge of the absolute position of the reference station.

A further object of the method is a transmitting/receiving device of a radio communication system that has at least one device for generating at least one radio signal with a rotating transmission characteristic. This can, for example, be achieved with the aid of suitable means for forming a directional radiation of transmission signals, for example by using antenna rays. A transmitting/receiving device of this kind is suitable for performing the aforementioned methods. The transmitting/receiving device can also be suitably adapted for the realization of the methods previously described.

The method further relates to a user terminal of a radio communication system, comprising a device for the detection of the rotating transmission characteristics of the radio signal, a device for checking the presence of a reference event, a device for determining the orientation of the transmission characteristic from the reference signal, a device for determining the position relative to the reference station from the orientation of the transmission characteristic and, if necessary, a device for determining the relative distance to the reference station from the signal parameters of the radio signal. This user terminal is thus especially suitable for implementing the aforementioned method and for therefore enabling the position of the user terminal to be determined. The user terminal can furthermore be suitably adapted for the realization of other steps of the method described here.

In accordance with a development, the user terminal features a device for the detection of the rotating transmission characteristic of a first and second radio signal, a device for checking the actual presence of a reference event, a device for determining the actual orientation of the transmission characteristic of the first and of the second radio signal from the reference event, a device for determining the position relative to a first and to a second reference station from the particular orientation of the transmission characteristic of the first and of the second radio signal and a device for determining the position relative to the reference stations from the position relative to the first and to the second reference stations.

All the aforementioned devices of the user terminal are to be principally understood as representative of the corresponding functional principles and can be realized in various ways by actual devices. All the aforementioned devices can in principle be realized by devices that are actually functionally and/or structurally isolated. A device, for example, incorporating a single or several functions and/or structures can undertake several functions of the named devices together, or a device that is by no means a single functionally and/or structurally isolated device can perform all functions. This is also possible by realizing an aforementioned device in the form of a data processing procedure, i.e. software.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
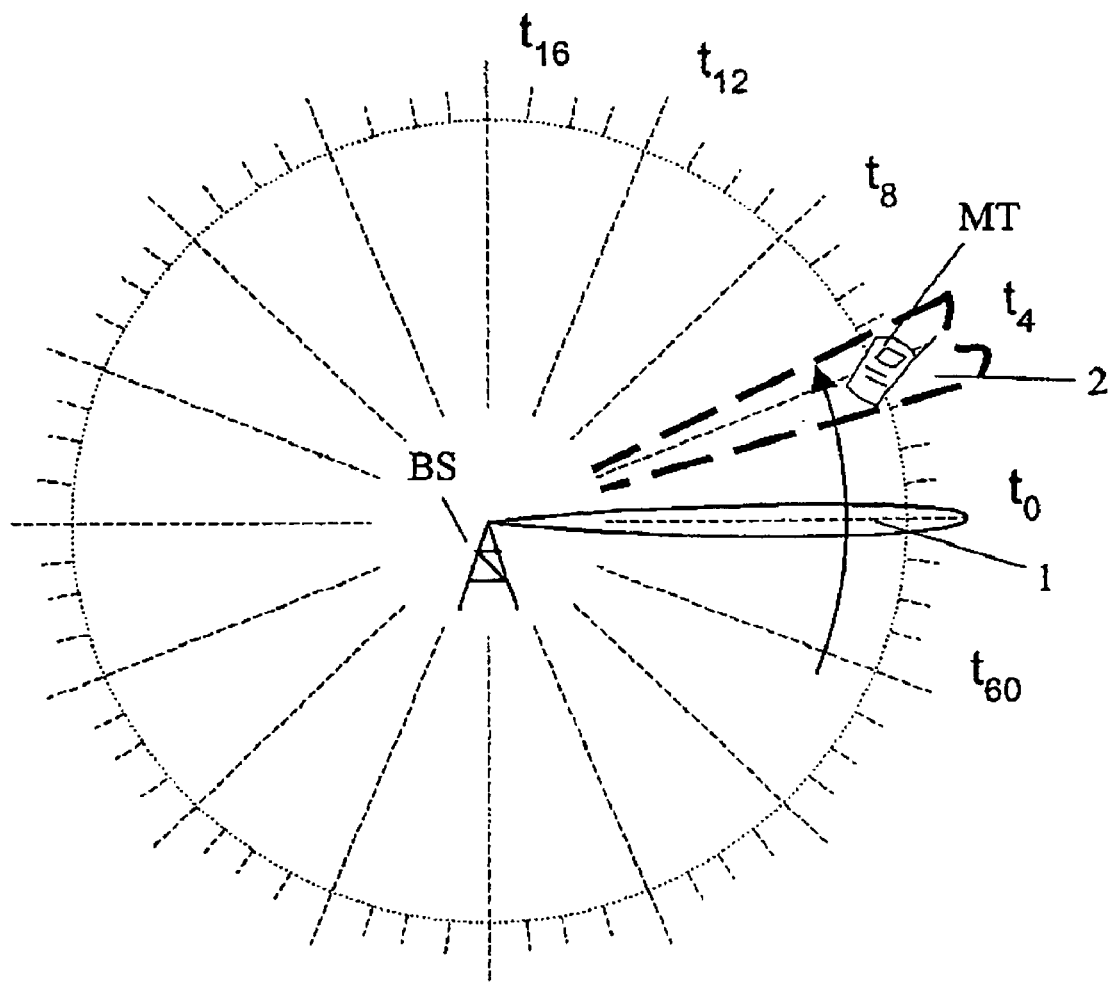
FIG. 1 is a determination of the position of a mobile radio terminal with the aid of time-related reference events.

Reference will now be made in detail to the preferred embodiments of the present invention, examples of which are illustrated in the accompanying drawings, wherein like reference numerals refer to like elements throughout.

FIG. 1 shows a base station BS of a mobile communication system and a corresponding mobile radio terminal MT, for example, a mobile telephone or navigation device with an interface to this mobile radio communication system. The base station BS in this case is assumed simply to be a base station of the mobile communication system that is currently provides the known communication link for the mobile radio terminal MT, i.e. in whose radio cell the mobile radio terminal MT has just checked in. As further explained, other adjacent base stations BS can also be used for the method described in the following.

The basis station BS is configured so that it generates a radio signal with a rotating transmission characteristic 1, for example by beam forming with a suitable antenna array. In principle, rotating antennas can also be used. A signaling channel such as a broadcast channel, that in any case must be present in any system, can, for example, be used as the radio signal. A discrete radiation angle of the directional radio signal 1 is assigned to each discrete time point $t_0$, $t_4$, $t_8$ etc. In the example shown in FIG. 1, the complete range around the base station BS, i.e. an angular range of 360°, is divided into steps of 6°. In a defined time interval $\Delta t$, for example in 10 ms, the radio signal moves on by the defined angular interval of 6° and, in this case, passes 0° every 600 ms, for example starting from a defined time zero point $T_0$.

By suitable signaling, this relationship between time and angle of radiation is communicated to the mobile radio terminal MT and stored in the mobile radio terminal Mt. In a simplest case, this communication need take place only once, provided the relationship remains constant. This relationship can be communicated to the mobile radio terminal MT for the supplying base station BS and, if necessary, also for adjacent base stations BS, when a change to the corresponding base station BS takes place as part of a handover. This relationship can also be communicated to the mobile radio terminal MT for all base stations BS of the mobile radio communication system, for example on the first recording of the mobile radio terminal MT in the mobile radio communication system. In all these cases, only minimum signaling exchange between the base station Bs and mobile radio terminal MT is necessary.

The mobile radio terminal MT can detect the radio signal 1 either by suitable training sequences or pilot signals within the radio signal, or also simply by the maximum field strength of the radio signal 1 measured by the mobile radio terminal MT. When the mobile radio terminal MT now detects the radio signal 1, it can, by using the time, detect the sector 2 in which it is located from the base station BS, i.e. its position relative to the base station BS. Because each time-related reference event, i.e. each time point $t_0$ to $t_n$ is assigned a discrete radiation angle, the mobile radio terminal MT can, without any additional signaling from or to the base station BS, detect solely by an internal check the presence of the time-related reference event from the stored relationship between the time point and radiation angle of the relevant radiation angle and thus the position relative to the base station BS.

Figure 2:
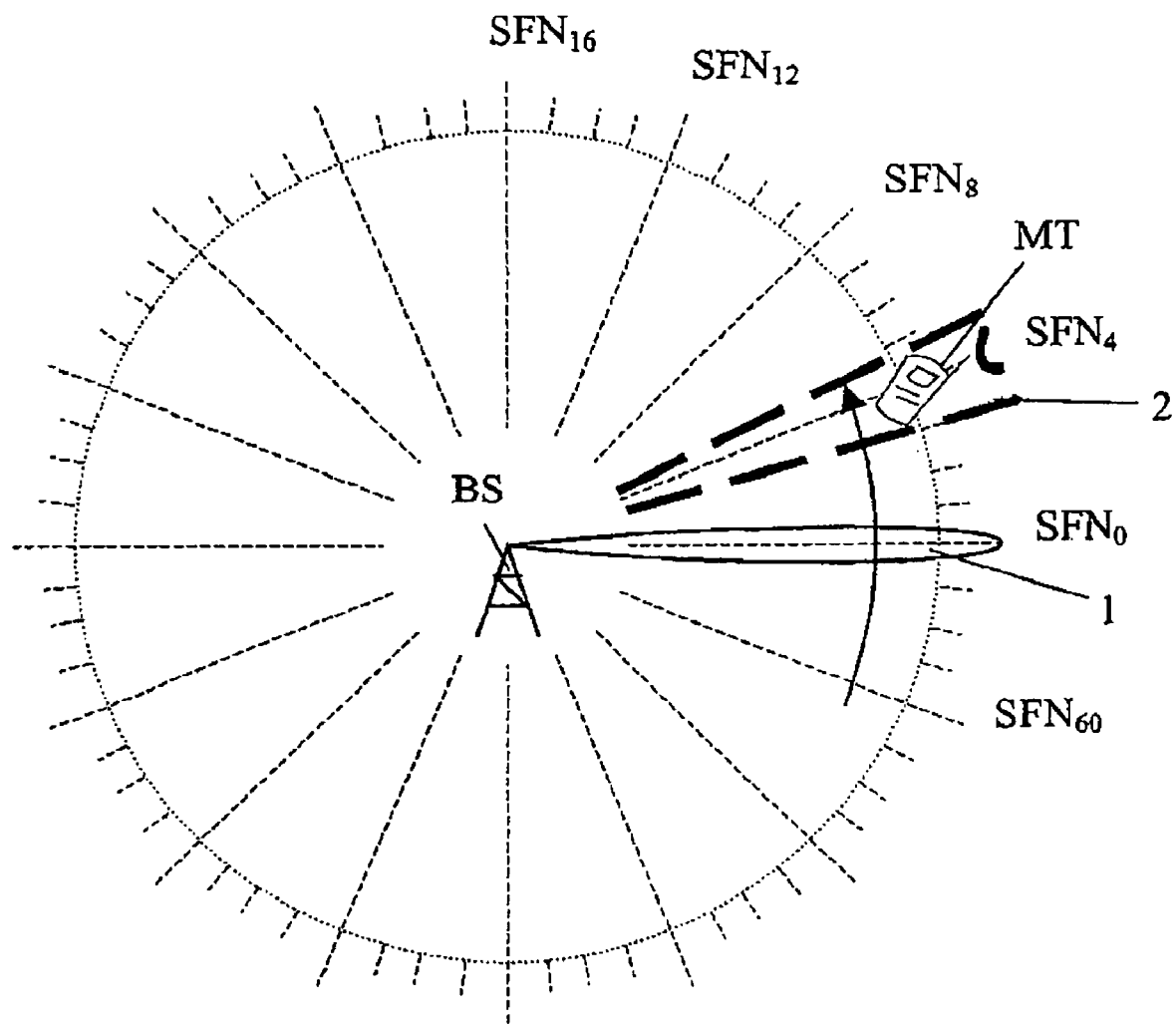
FIG. 2 shows a determination of the position of a mobile radio terminal with the aid of numbers of data frames as reference events.

As an alternative to the time-related reference events, identification data for certain data segments of the radio signal 1, particularly numbers of data frames (sequence frame number SFN) of the radio signal 1 can be communicated to the mobile radio terminal. This alternative is shown in FIG. 2. The mobile radio terminal MT then knows that when a data frame with a determined sequence frame number $SFN_0$, $SFN_4$, $SFN_8$ etc. is received its transmission took place at a defined radiation angle, for example 0° for $SFN_0$. This relationship between the sequence frame number and radiation angle can be communicated by corresponding signaling to the mobile radio terminal MT in a similar manner to the previously described alternatives for time-related reference signals and stored in the mobile radio terminal MT. From the relationship between the transmitted sequence frame number and the direction of radiation, the mobile radio terminal MT can in turn, after detection of the radio signal 1, determine the sector 2 in which it is located, i.e. its position relative to the base station BS.

Some advantages of this method should now be described. Practically no additional navigation-specific devices are necessary. Furthermore, the transmission of radio signals from the base station BS in the actual mobile radio cell must not be interrupted in order to measure adjacent base stations BS, because the radio signals are tuned to each other as part of the known frequency and channel assignment of the mobile radio communication system. For this reason, the application of the method to a mobile radio communication system causes hardly any additional interference due to the radio signal used for position determination. The mobile radio terminal MT does not need to actively transmit its own signaling. Moreover, the accuracy of this method is scalable. The narrower the directional radiation of the radio signal the narrower the resulting radio beam and therefore the higher the angular resolution and the smaller the angular intervals that can be achieved for the arrangement in accordance with FIGS. 1 and 2.

Figure 3:
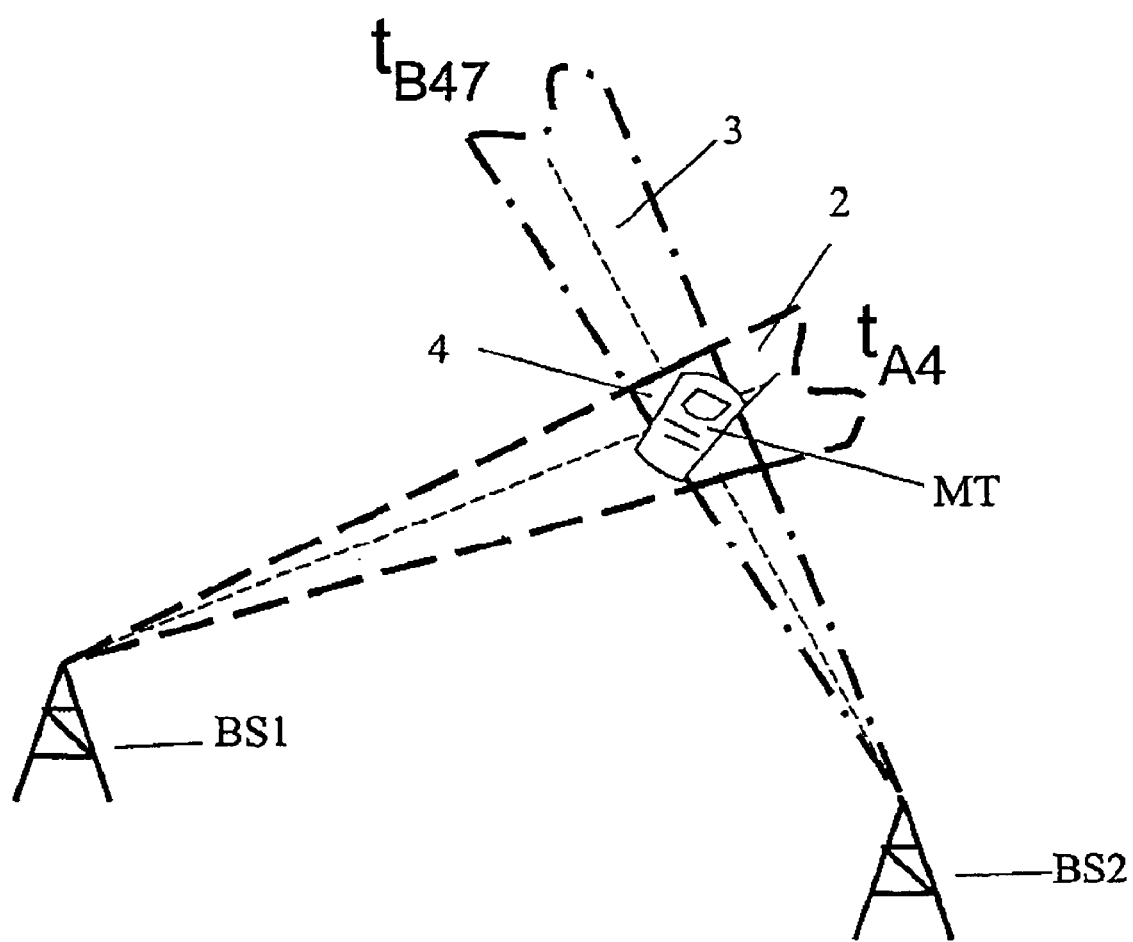
FIG. 3 shows a determination of the position of a mobile radio terminal from time-related reference events with the aid of two reference stations.

FIG. 3 shows a method for position determination with the aid of two reference stations BS1, BS2. The mobile radio terminal MT determines its position relative to each of the base stations BS1, BS2 in accordance with one of the methods already described. FIG. 3, for example, shows the method with the aid of time-related reference events. In the case shown in FIG. 3, the mobile radio terminal MT determines that it is at an angle relative to the base station BS1 that corresponds to the radiation time point $t_{A4}$ and at an angle relative to the base station BS2 that corresponds to the radiation time point $t_{B47}$. Therefore, the mobile radio terminal MT knows that on one hand it is in the sector 2 relative to the base station BS1 and on the other hand is also in sector 3 relative to base station BS2. The mobile radio terminal MT can determine its position from the geometric determination of the intersection area 4 of these two sectors 2, 3. To do this, the mobile radio terminal MT requires only the knowledge of the positions of base stations BS1, BS2 relative to each other or their absolute position. These can be communicated to the mobile radio terminal MT as part of the signaling already mentioned.

Figure 4:
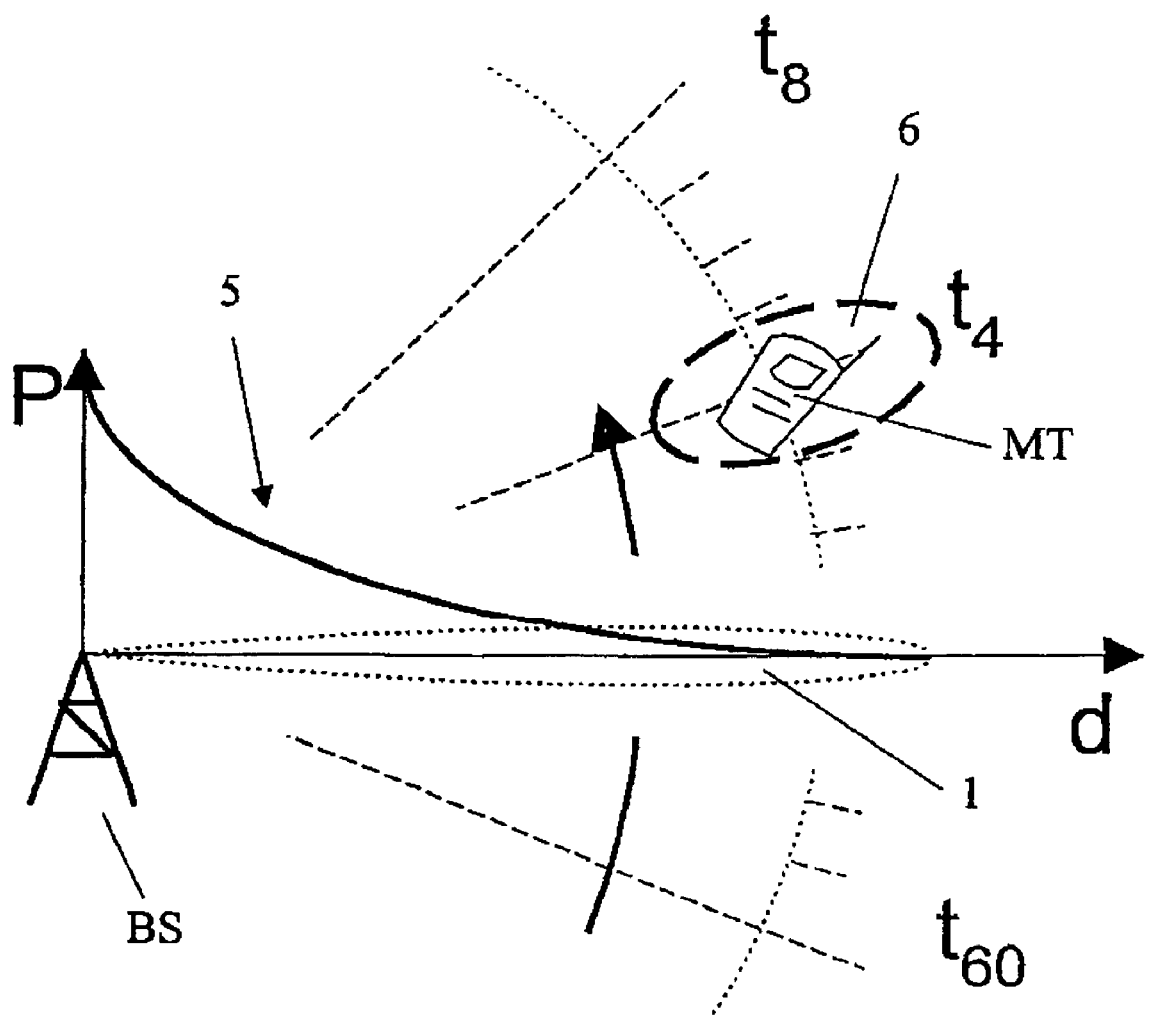
FIG. 4 shows a determination of the position of a mobile radio terminal from time-related reference events and signal parameters of the radio signal of a reference station.

An alternative method to this is shown in FIG. 4. In this case the mobile radio terminal MT again first determines its position relative to the base station BS in accordance with one of the aforementioned methods, for example by using the time-related reference events in FIG. 4. Furthermore, the mobile radio terminal MT determines certain signal parameters for the radio signal 1, particularly the attenuation 5 (path loss) of the transmitted power P of the radio signal 1 along its propagation path d compared to a reference signal. Because this attenuation 5 is a measure of the length of the propagation path d, the mobile radio terminal MT can determine its distance d relative to the base station BS from it. From the determined relative position and the determined relative distance d, the mobile radio terminal MT can determine its position 6 relative to the base station BS. If, furthermore, the absolute position of the base station BS is communicated to the mobile radio terminal MT as part of the aforementioned signaling, the mobile radio terminal MT can also determine its absolute position from the information gained. Also, the signal transit time can be measured instead of the attenuation of the radio signal 1 or corresponding information (timing advance) can be obtained from the information content of the data of the radio signal 1.

Figure 5:
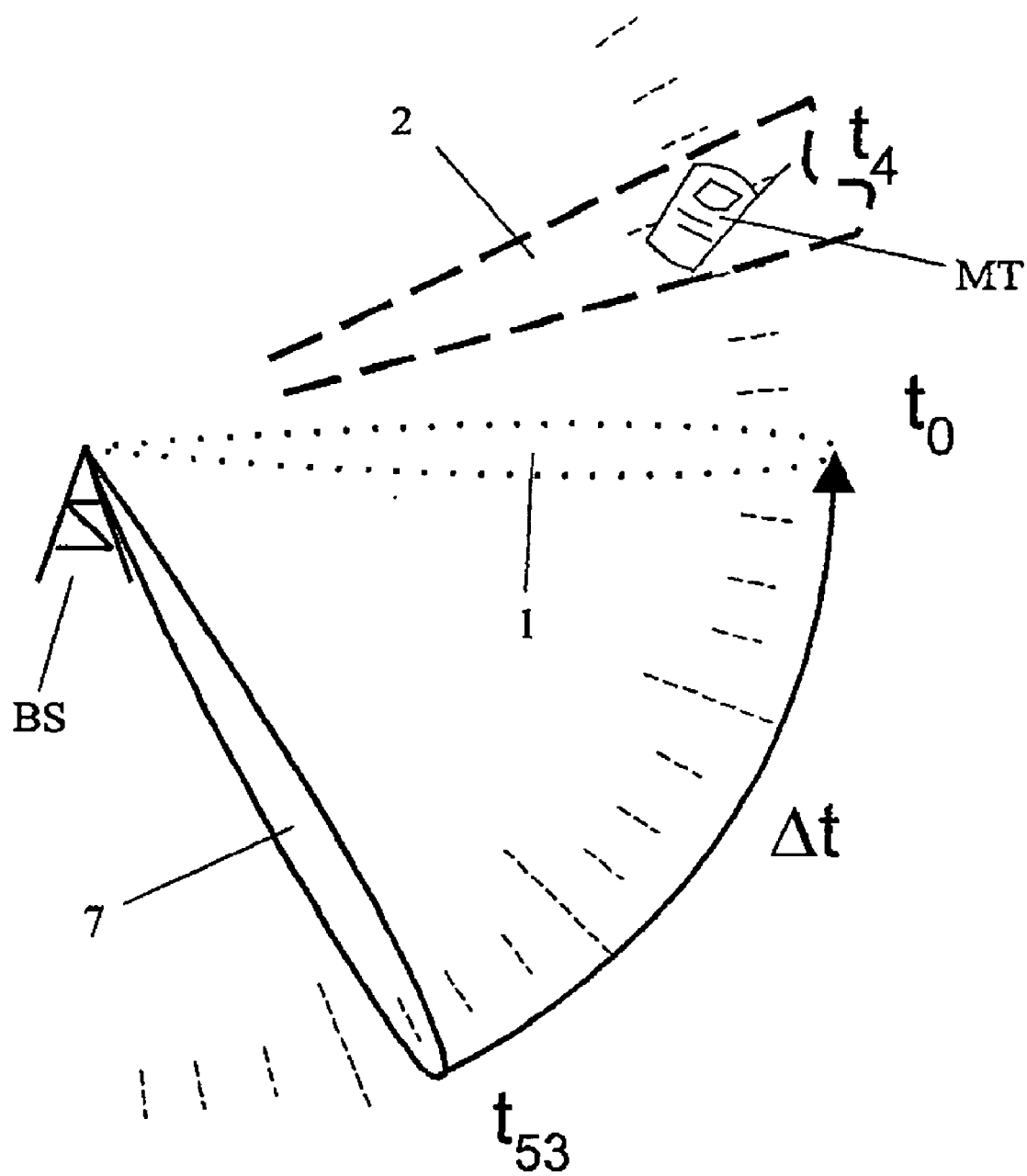
FIG. 5 shows the use of several directional, rotating radio beams for determining position.

FIG. 5 shows a further alternative whereby not only one directional rotating radiation 1 is used to generate the rotating transmission characteristic but instead several directional, rotating radiations 1, 7 of the base station BS are provided. In this case, an identical radio signal can be transmitted simultaneously via each of the directional radiations. Between both radiations 1, 7 is a time difference $\Delta t$, corresponding to the corresponding angular difference of the radiation angle. If, as is the case in FIG. 5, the radiation angle of the first radiation 1 at time point $t_0$ is just 0°, the second radiation reaches this radiation angle after time $\Delta t$. Possible inaccuracies in the position determination due to fluctuations in the signal of the directional radiations 1, 7 can thus be compensated for, because a directional radiation 1, 7 is detected more frequently for each time unit and several directional radiations 1, 7 can thus be averaged in a short time.

Figure 6:
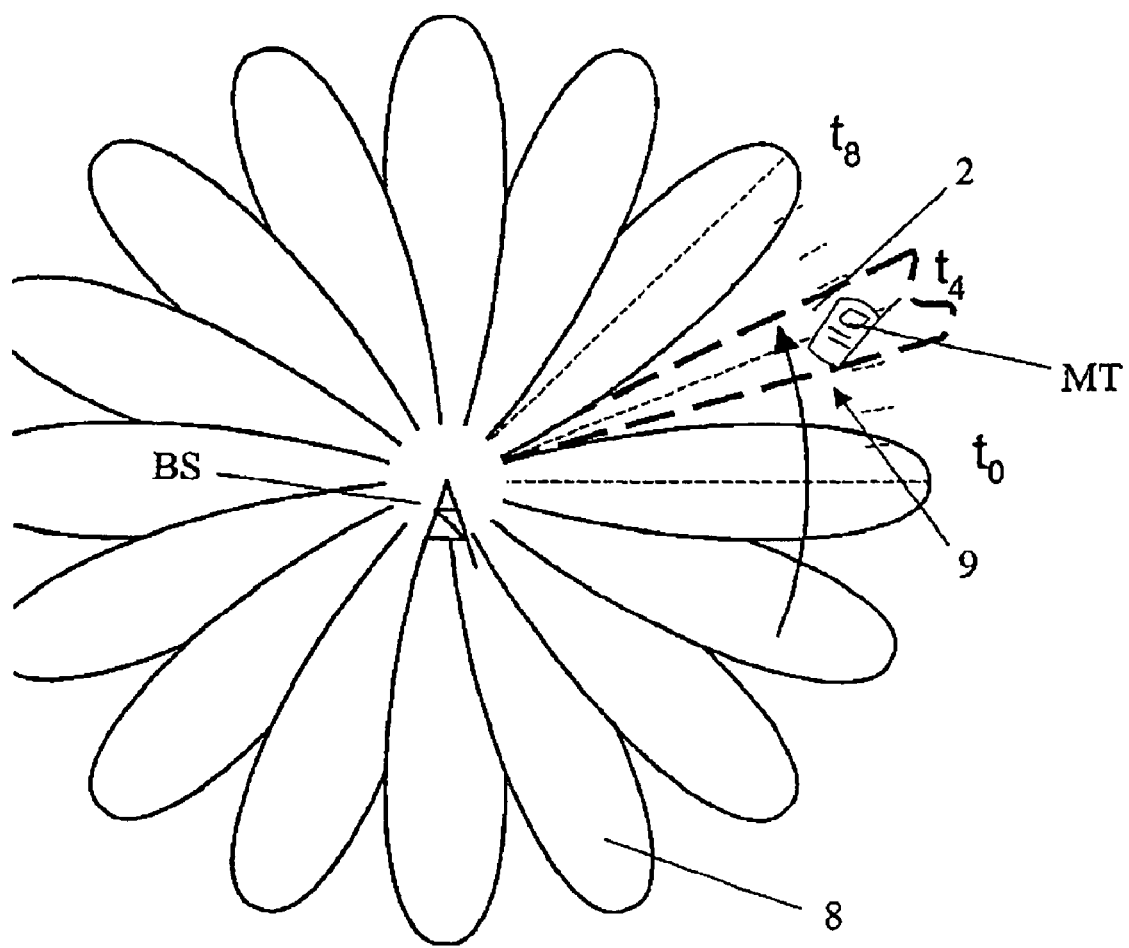
FIG. 6 shows the use of directional, rotating attenuation of the radio signal for determining position.

A further alternative version is shown in FIG. 6. Here, the directional radiations 8 are generated by the base station BS N for the described radio signal, resulting in a transmission characteristic that is practically omni directional. This means that now in the rotating sequence one of the directional radiations 8 is switched off in turn for a certain time duration $\Delta t$, so that a directional attenuation 9 occurs in the omnidirectional transmission characteristic, that in turn leads to a rotating transmission characteristic of the radio signal. The further detection of the rotating transmission characteristic by the mobile radio terminal MT and the determination of the relative position in a sector 2 takes place similar to the method already described, whereby the mobile radio terminal MT now uses only a minimum of the radiation (i.e. the minimum amount of the received power). This method offers a particularly advantageous possibility of being used in the normal mobile radio communication systems because the corresponding channel of the radio signal used is available most of the time and dips in the received power occur only briefly, that can occur anyway in the fading channels present in the mobile radio systems. Practically any radio signal or any channel can thus be used for the described method, without the normal operation of the mobile radio communication system being noticeably influenced.

A special possibility of realizing the method in a mobile radio communication system is explained in the following. In mobile radio communication systems, data such as signaling data, voice data or other useful data is transmitted via a radio interface between base stations BS and mobile radio terminals MT. An example of actual mobile radio communication systems are mobile radio networks of the second generation to the GSM standard and with a TDMA transmission method, that are operated at carrier frequencies of 900, 1800 or 1900 MHz. Further examples are third generation future mobile radio networks such as UMTS, based on a CDMA, TD/CDMA, FDD (Frequency Division Duplex) or TDD (Time Division Duplex) transmission methods and using carrier frequencies of approximately 2000 MHz. The data to be transmitted between the network-end base stations BS of the mobile radio network and the mobile radio terminals MT are transmitted on these carrier frequencies.

Special radio networks are thus those that have a time-slot structure. The time slots are usually combined in time slot frames that can in turn be part of a higher-level frame structure. Example of such mobile radio networks with a time-slot structure are TDMA, TDD, TD/CDMA, TD/SD-CDMA and FDD systems.

A data frame or burst with a specific predefined structure is normally transmitted within a time slot of a data connection. The data frame can contain not only useful data but also other data such as control data, measuring data or signaling data, which is necessary or helpful for the transmission of the useful data.

Figure 9:
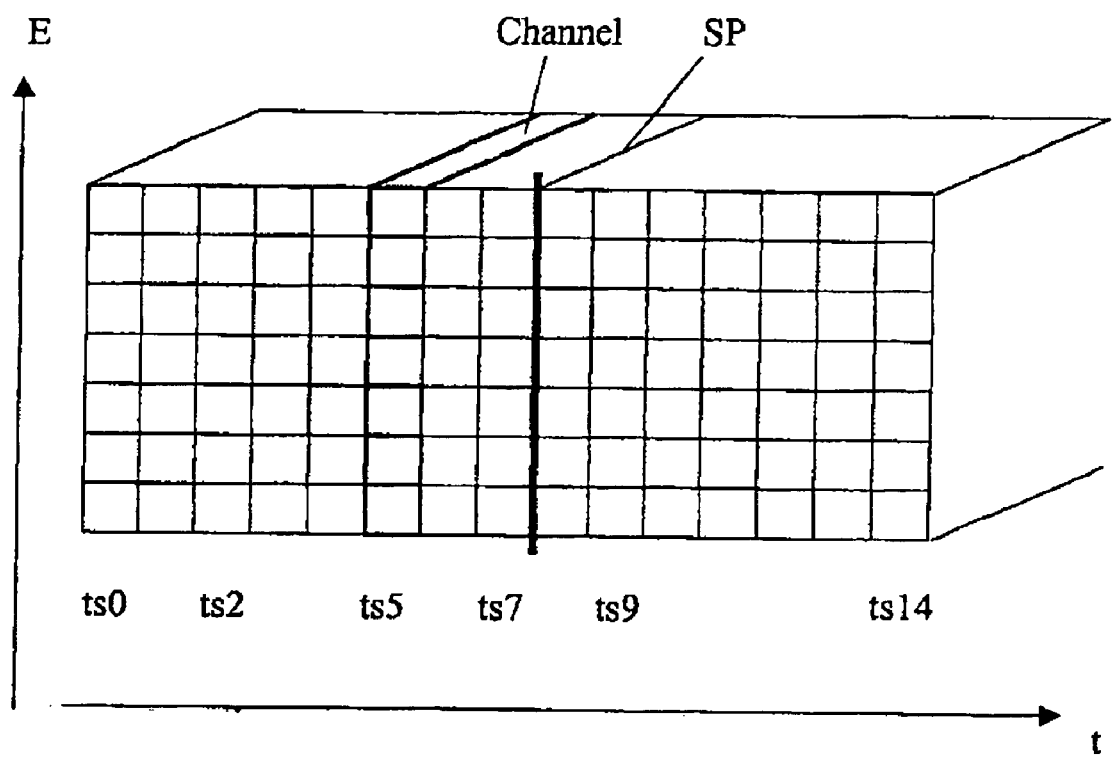
FIG. 9 shows a time slot structure of a TDD system.

FIG. 9 shows a time slot structure of a TDD system whereby a time slot frame 16 has time slots ts0 to ts15. FIG. 9 shows the first eight time slots ts0 to ts7 assigned to the downlink with the remaining time slots ts8 to ts15 being assigned to the uplink after the switching point SP. Several switching points SP can also be provided within a time slot of this kind and these switching points can be inserted at different points in the time slot frame.

Figure 10:
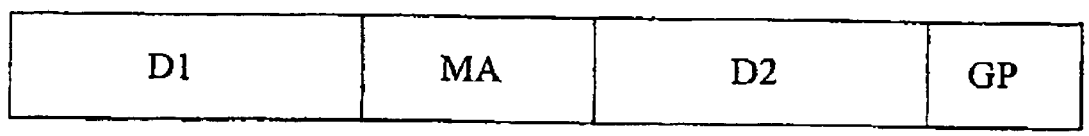
FIG. 10 shows a time slot frames of a TDD system with midamble.

FIG. 10 shows the distribution of a time frame (burst) transmitted within a time slot. This data frame includes the first amount of useful data D1, followed by measuring data or signaling data MA (midambles) and a second amount of useful data D2 and control data GP for checking a faulty transmission of useful data. The midambles MA are as a rule especially provided for measuring the transmission properties of the radio link.

Within the framework of this method, the midamble MA, shown in FIG. 10, of a UMTS mobile radio communication system that operates in accordance with a TDD method, can be used with a radio signal with a rotating transmission characteristic to assign this signal unmistakably to a specific base station BS. This midamble MA can be used as a training sequence for the detection of the rotating transmission characteristic.

With an FDD system, no midamble MA is as a rule provided in previously existing or planned systems. With such systems, an additional pilot signal can be used instead of a midamble MA, whereby it can also be used the same as the midamble MA with an TDD system for detection and unmistakable assignment of rotating transmission characteristics to specific base stations BS.

The method can thus be used in the FDD and TDD modes with mobile radio networks to the UMTS standard. As already described, the directional radiation of the radio signal can be switched from data frame to data frame by a previously defined angular amount. The switching by a specific angular amount can also take place coupled with other reference events, for example with each time slot for time-division multiplex systems or with TD-SCDMA systems, for instance with each subframe of the data frame structure. Suitable measures of this kind can in turn enable the detection speed to be suitably varied and, in an ideal case, increased. The mobile radio terminal MT can determine the associated angle by the data frame number SFN, as already described.

With TDD, for example, one or more midambles MA can be sent within the data frame without further useful data, because the receipt of the midamble of a data frame is sufficient for detection by the mobile radio terminal MT and further data content of the data frame is basically unnecessary. According to one potential embodiment, data frames that consist solely of a midamble MA can potentially be transmitted in addition to a cell-wide transmitted midamble MA, that may still have to be transmitted for compatibility reasons for older mobile radio terminals MT in order to provide the data necessary for the communication operation for all mobile radio terminals MT. The good correlation properties of the midambles MA relative to each other automatically guarantees that the intracell interference due to the midamble MA transmitted as part of this method is barely increased. Furthermore, the power of the midambles MA transmitted cell-wide can also be lowered in order to reduce the interference in the system. In an extreme case, the power of any additionally transmitted midambles MA is chosen precisely to match the reduction in the cell-wide midamble MA. Because of this, the intercell interference remains unchanged with respect to a system without a navigation beam. Furthermore, this solution is the most efficient for the transmitter amplifier of the base station BS because no sudden power variations occur in the transmitted signal.

Figure 7:
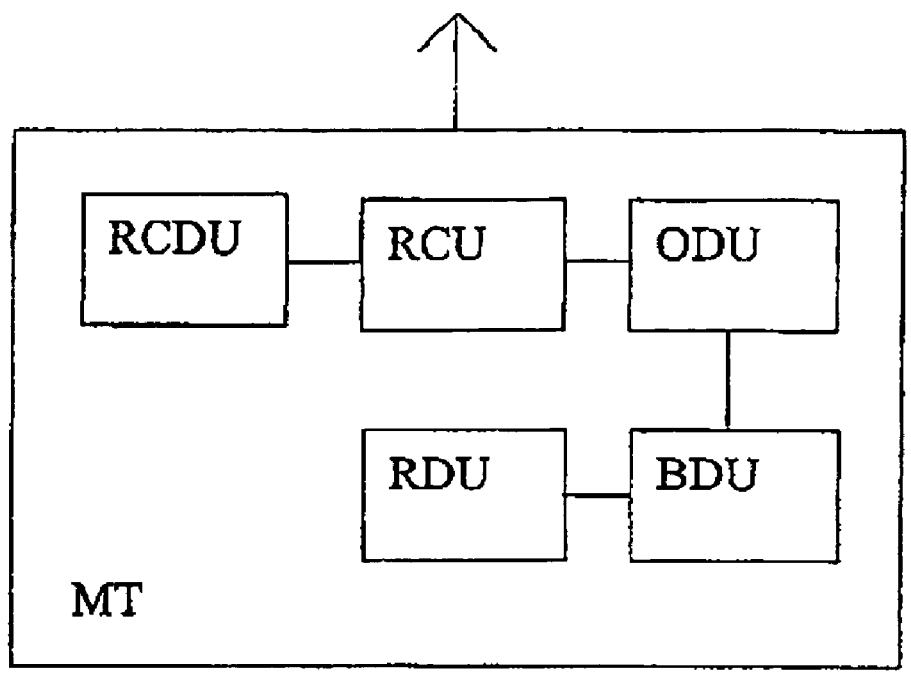
FIG. 7 shows a mobile radio terminal for position determination in accordance with a method corresponding to FIG. 4.
Figure 8:
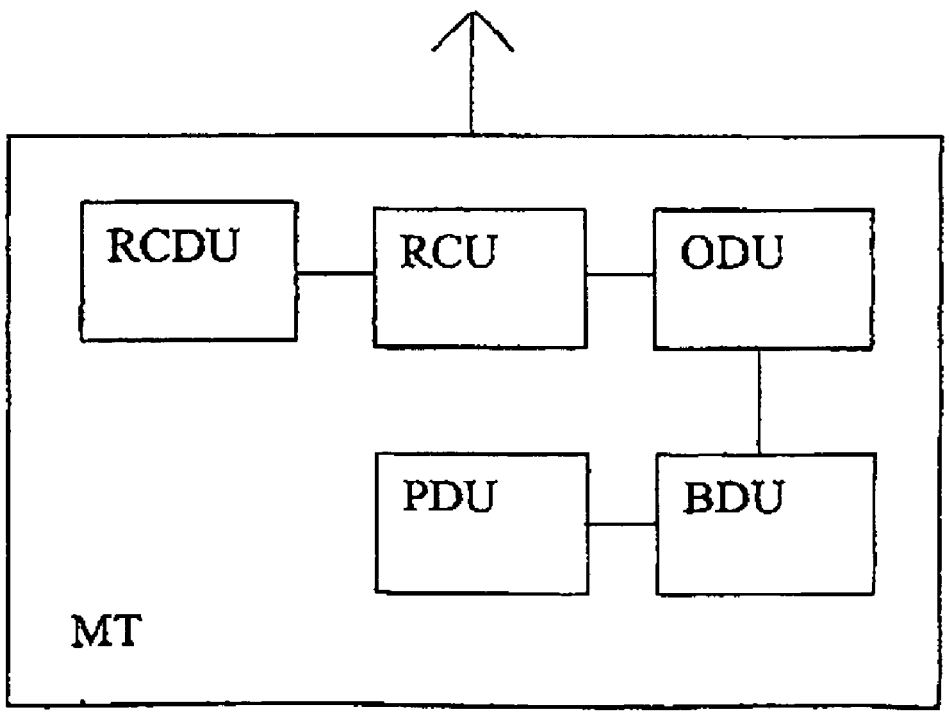
FIG. 8 shows a mobile radio terminal for position determination in accordance with a method corresponding to FIG. 3.

FIGS. 7 and 8 show mobile radio terminals MT of a radio communication system. In addition to the devices detailed in the following, these terminals also have normal devices for radio communication within the radio communication system.

The terminal MT shown in FIG. 7 is suitable for realizing a method in accordance with FIG. 4. In particular, it has the following. A device (Rotating Characteristic Detection Unit RCDU) for detecting the rotating transmission characteristic of the radio signal, a device (Reference Check Unit RCU) for checking the presence of a reference event, a device (Orientation Determination Unit ODU) for determining the orientation of the transmission characteristic from the reference event, a device (Bearing Determination Unit BDU) for determining the relative position of the reference station from the orientation of the transmission characteristic and a device (Range Determination Unit RDU) for determining the relative distance to the reference station from signal parameters of the radio signal. The terminal MT can thus determine its position using the method already described with the aid of FIG. 4.

The terminal MT shown in FIG. 8 is suitable for realizing a method in accordance with FIG. 3. In particular, it has the following; a device (Rotating Characteristic Detection Unit RCDU) for detecting the rotating transmission characteristic of a first and second radio signal, a device (Reference Check Unit RCU) for checking the presence of a reference event, a device (Orientation Determination Unit ODU) for determining the orientation of the transmission characteristic of the first and second radio signal from the reference event, a device (Bearing Determination Unit BDU) for determining the position relative to a first and second reference station from the particular orientation of the transmission characteristic of the first and of the second radio signal and a device (Position Determination Unit PDU) for determining the position relative to the reference stations from the position relative to the first and second reference station. The terminal MT can thus determine its position using the method already described with the aid of FIG. 3.

The invention has been described in detail with particular reference to preferred embodiments thereof and examples, but it will be understood that variations and modifications can be effected within the spirit and scope of the invention.

The invention claimed is:

1. A method for determining the position of a mobile object using at least one radio signal with a rotating transmission characteristic, each radio signal being transmitted by a reference station, comprising:
    detecting the radio signal at the mobile object;
    checking for the presence of a reference event associated with the radio signal, the mobile object checking for reference event when the mobile object detects the radio signal;
    communicating to the mobile object a relationship between the orientation of the transmission characteristic and the reference event, the reference event being a predefined data structure for the radio signal or a predefined data content for the radio signal; and
    determining the position of the mobile object relative to the reference station, the mobile object determining the position from the relationship between the orientation of the transmission characteristic and the reference event.

2. A method in accordance with claim 1, wherein
    the mobile object additionally determines a relative distance of the mobile object from the reference station, and
    the relative distance is determined from signal parameters of the radio signal.

3. A method in accordance with claim 2, wherein
    physical transmission parameters of the radio signal are measured by the mobile object, and
    the physical transmission parameters are regarded as signal parameters.

4. A method in accordance with claim 2, wherein
    data content of the radio signal is regarded as a signal parameter,
    the data content relates to physical transmission parameters of the radio signal, and the mobile object compares reception characteristics of the radio signal with the physical transmission parameters to determine the relative distance.

5. A method in accordance with claim 1, wherein
the mobile object detects first and second radio signals and checks each for the presence of a reference event, the first and second radio signals being transmitted from first and second reference stations, and
the mobile object determines its position relative to both the fist and second reference stations.

6. A method in accordance with claim 1, wherein
the reference event relates to the time of detection of the radio signal,
the time of transmission of the radio signal varies around the reference station, and
a relationship between the orientation of the radio signal and the time of transmission is communicated to the mobile object.

7. A method in accordance with claim 1, wherein
the reference event includes identification data that identifies the specific data segments of the radio signal.

8. A method in accordance with claim 1, wherein
a data frame associated with transmission of the radio signal varies around the reference station,
the mobile object checks for a data frame number associated with the radio signal, when the mobile object detects the radio signal, and
a relationship between the data frame number and orientation of the radio signal is communicated to the mobile object.

9. A method in accordance with claim 1, wherein the rotation transmission characteristic is achieved by rotating a direction of radiation of the radio signal.

10. A method in accordance with claim 9, wherein
the rotating transmission characteristic is achieved by transmitting at least two radio signals from the reference station such that radio signals rotate in opposing directions around the reference station.

11. A method in accordance with claim 1, wherein
the radio signal is transmitted with an omnidirectional radiation, and
the rotating transmission characteristic is generated through a rotating area of attenuation around the reference station.

12. A method in accordance with claim 1, wherein
the radio signal is also used to transmit signaling data and/or communication data.

13. A method in accordance with claim 4, wherein
the mobile object detects first and second radio signals and checks each for the presence of a reference event, the first and second radio signals being transmitted from first and second reference stations, and
the mobile object determines its position relative to both the fist and second reference stations.

14. A method in accordance with claim 13, wherein
the reference event relates to the time of detection of the radio signal,
the time of transmission of the radio signal varies around the reference station, and
a relationship between the orientation of the radio signal and the time of transmission is communicated to the mobile object.

15. A method in accordance with claim 14, wherein
the reference event includes identification data that identifies the specific data segments of the radio signal.

16. A method in accordance with claim 15, wherein
a data frame associated with transmission of the radio signal varies around the reference station,
the mobile object checks for a data frame number associated with the radio signal, when the mobile object detects the radio signal, and
a relationship between the data frame number and orientation of the radio signal is communicated to the mobile object.

17. A method in accordance with claim 16, wherein the rotation transmission characteristic is achieved by rotating a direction of radiation of the radio signal.

18. A method in accordance with claim 17, wherein
the rotating transmission characteristic is achieved by transmitting at least two radio signals from the reference station such that radio signals rotate in opposing directions around the reference station.

19. A method in accordance with claim 18, wherein
the radio signal is transmitted with an omnidirectional radiation, and
the rotating transmission characteristic is generated through a rotating area of attenuation around the reference station.

20. A method in accordance with claim 19, wherein
the radio signal is also used to transmit signaling data and/or communication data.

21. A user terminal comprising:
a device to detect a radio signal, which is transmitted from a reference station with a data structure or data content that varies rotationally around the reference station;
a device to check for the presence of a reference event, the reference event being the data structure or data content associated with detected the radio signal;
a memory to store a relationship between the data structure or data content and a rotational position of transmission around the reference station; and
a device to determine a position of the user terminal relative to the reference station based on the reference event and the relationship between the data structure or data content and the rotational position.

22. A user terminal in accordance with claim 21, further comprising:
a device to determine a relative distance of the user terminal from the reference station based on reception signal parameters of the radio signal.

* * * * *